United States Patent
Chavda et al.

(10) Patent No.: US 10,678,656 B2
(45) Date of Patent: *Jun. 9, 2020

(54) INTELLIGENT RESTORE-CONTAINER SERVICE OFFERING FOR BACKUP VALIDATION TESTING AND BUSINESS RESILIENCY

(71) Applicant: International Business Machines Corporation, Armonk, NY (US)

(72) Inventors: Kavita Chavda, Roswell, GA (US); Nagapramod S. Mandagere, San Jose, CA (US); Steven Pantridge, Quebec (CA); Ramani R. Routray, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 213 days.

This patent is subject to a terminal disclaimer.

(21) Appl. No.: 15/805,540

(22) Filed: Nov. 7, 2017

(65) Prior Publication Data

US 2018/0060187 A1    Mar. 1, 2018

Related U.S. Application Data

(63) Continuation of application No. 13/664,931, filed on Oct. 31, 2012, now Pat. No. 9,858,157.

(51) Int. Cl.
*G06F 11/14* (2006.01)
*G06F 11/36* (2006.01)
*G06F 16/182* (2019.01)

(52) U.S. Cl.
CPC ...... *G06F 11/1469* (2013.01); *G06F 11/1438* (2013.01); *G06F 11/1448* (2013.01);
(Continued)

(58) Field of Classification Search
CPC .............. G06F 11/1448; G06F 11/1451; G06F 11/1469; G06F 16/188
(Continued)

(56) References Cited

U.S. PATENT DOCUMENTS 7,370,233 B1    5/2008   Sobel et al.
8,020,041 B2 *  9/2011   Huang ................ G06F 11/2097
                                                    714/11
(Continued)

OTHER PUBLICATIONS

Mell et al., "The NIST Working Definition of Cloud Computing," Version 15, Oct. 7, 2009, 2 pages.
(Continued)

*Primary Examiner* — Marcin R Filipczyk
(74) *Attorney, Agent, or Firm* — Schmeiser, Olsen & Watts, LLP; Michael Petrocelli

(57) ABSTRACT

A method and system for creating a new restore container. A count that is determined for each unique infrastructure container of existing unique infrastructure containers is a number of instances in which a particular container type that is unique for each unique infrastructure container has been utilized. In response to both determining that the count for one unique infrastructure container is equal to or greater than a specified threshold and determining that a popular infrastructure container does not exist within a central repository that stores the existing unique infrastructure containers, the new restore container is created within the central repository by determining a most similar container of the existing restore containers whose software stack content matches, in part, software content in a first software stack of the popular infrastructure container more closely than does software content in the software stack of any other existing restore container.

20 Claims, 7 Drawing Sheets

(52) U.S. Cl.
CPC ...... *G06F 11/1451* (2013.01); *G06F 11/1484* (2013.01); *G06F 11/3664* (2013.01); *G06F 16/182* (2019.01); *G06F 2201/81* (2013.01)

(58) Field of Classification Search
USPC ................................ 707/645, 647, 674, 678
See application file for complete search history.

(56) References Cited

U.S. PATENT DOCUMENTS

| | | | | |
|---|---|---|---|---|
| 8,201,026 | B1* | 6/2012 | Bornstein | G06F 9/45508 714/45 |
| 8,719,522 | B1 | 5/2014 | Chait et al. | |
| 2009/0089879 | A1 | 4/2009 | Wang et al. | |
| 2009/0216816 | A1 | 8/2009 | Basler et al. | |
| 2010/0131794 | A1* | 5/2010 | Zheng | G06F 11/1438 714/6.1 |
| 2011/0202734 | A1 | 8/2011 | Dhakras et al. | |
| 2013/0173771 | A1* | 7/2013 | Ditto | G06F 11/1438 709/223 |
| 2016/0292025 | A1* | 10/2016 | Gupta | G06F 11/076 |

OTHER PUBLICATIONS

Office Action (dated Jan. 30, 2015) for U.S. Appl. No. 13/664,931, filed Oct. 31, 2012, filed Oct. 31, 2012.
Amendment (dated Apr. 30, 2015) for U.S. Appl. No. 13/664,931, filed Oct. 31, 2012, filed Oct. 31, 2012.
Final Office Action (dated May 25, 2016) for U.S. Appl. No. 13/664,931, filed Oct. 31, 2012, filed Oct. 31, 2012.
Final Amendment (dated Jul. 25, 2016) for U.S. Appl. No. 13/664,931, filed Oct. 31, 2012, filed Oct. 31, 2012.
Advisory Action (dated Aug. 30, 2016) for U.S. Appl. No. 13/664,931, filed Oct. 31, 2012, filed Oct. 31, 2012.
RCE and PA (Sep. 30, 2016) for U.S. Appl. No. 13/664,931, filed Oct. 31, 2012, filed Oct. 31, 2012.
Office Action (dated Feb. 7, 2017) for U.S. Appl. No. 13/664,931, filed Oct. 31, 2012, filed Oct. 31, 2012.
Amendment (dated May 2, 2015) for U.S. Appl. No. 13/664,931, filed Oct. 31, 2012, filed Oct. 31, 2012.
Notice of Allowance (dated Aug. 29, 2017) for U.S. Appl. No. 13/664,931, filed Oct. 31, 2012, filed Oct. 31, 2012.

* cited by examiner

| ID | OS | DP SOFTWARE | APP. SOFTWARE |
|---|---|---|---|
| 1 | Windows XP | TSM 5.5 | Oracle 11g |
| 2 | Redhat Linux 5.5 | Netbackup 5.2 | DB2 database 9.0 |
| ⋮ | ⋮ | ⋮ | ⋮ |
| N | ... | ... | ... |

FIG. 6

INTELLIGENT RESTORE-CONTAINER SERVICE OFFERING FOR BACKUP VALIDATION TESTING AND BUSINESS RESILIENCY

This application is a continuation application claiming priority to Ser. No. 13/664,931, filed Oct. 31, 2012, now U.S. Pat. No. 9,858,157, issued Jan. 2, 2018.

BACKGROUND

1. Field

The disclosure relates generally to a computer implemented method, a computer program product, and a data processing system for strategies to backup business critical data. More specifically, The disclosure relates generally to a computer implemented method, a computer program product, and a data processing system for strategies to backup business critical data in conformance with service level agreements in terms of backup coverage, frequency of backup, mode of backup and periodic testing of backup with service provider in a service provider-managed model of backup-recovery.

2. Description of the Related Art

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure including a network of interconnected nodes.

Based on the sensitivities to downtime, as defined by restore point objectives and restore time objectives of service level agreements, organizations apply different strategies to backup business critical data. Even though, exact data protection strategies may vary, good data protection (backup) must be a universal part of an overall risk management strategy. A service provider-managed model of backup-recovery also defines service level agreements in terms of backup coverage, frequency of backup, mode of backup and periodic testing of backup with service provider.

Testing of backup is a very critical part of the complete data protection ecosystem. Testing of backup, such as the validation of integrity of backup image, is performed to test the quality and completeness of the backup images. However, this particular aspect of testing often gets low priority.

Hardware and software resources are often unavailable. Skills required to perform the testing effectively are labor intensive, and often either intrusive/non-intrusive due to regulations that apply on the data. Sampling from numerous backups and scheduling the testing procedure also hamper and delay backup testing.

Premium service level agreements require data protection service providers periodically sample and test-restore backup images. This process ensures multiple objectives. The backup is ensured to be completed successfully in reality irrespective of the status reported by data protection software. The backup is ensured to be restorable from application perspective, such as for a database if both data and logs were backed up together consistently. Furthermore, the backup provides insight into the exact Recovery Time Objective the environment is expected to achieve.

SUMMARY

According to an illustrative embodiment of the present invention, a computer implemented method is provided for creating a restore container. An existing data protection environment is analyzed to determine a plurality existing infrastructure containers. A popular infrastructure container is identified from the plurality of existing infrastructure containers. Responsive to determining that the popular infrastructure container does not exist within a central repository, the restore container is created within the central repository to match the popular infrastructure container.

According to an illustrative embodiment of the present invention, a computer program product is provided for creating a restore container. The computer program product comprises a computer readable storage medium. Program instructions stored on the computer readable storage medium analyze an existing data protection environment to determine a plurality existing infrastructure containers. Program instructions stored on the computer readable storage medium identify a popular infrastructure container from the plurality of existing infrastructure containers. In response to determining that the popular infrastructure container does not exist within a central repository, program instructions stored on the computer readable storage medium create the restore container within the central repository to match the popular infrastructure container.

According to an illustrative embodiment of the present invention, an apparatus is provided for creating a restore container. The apparatus comprises a bus, a storage device connected to the bus, and a processing unit connected to the bus. The storage device contains computer usable code. The processing unit executes the computer usable code to analyze an existing data protection environment to determine a plurality existing infrastructure containers. The processing unit executes the computer usable code to identify a popular infrastructure container from the plurality of existing infrastructure containers. Responsive to determining that the popular infrastructure container does not exist within a central repository, the processing unit executes the computer usable code to create the restore container within the central repository to match the popular infrastructure container.

BRIEF DESCRIPTION OF THE SEVERAL VIEWS OF THE DRAWINGS

FIG. 6 is a data structure containing metadata describing software stacks of restore containers shown according to an illustrative embodiment.

DETAILED DESCRIPTION

Figure 1:
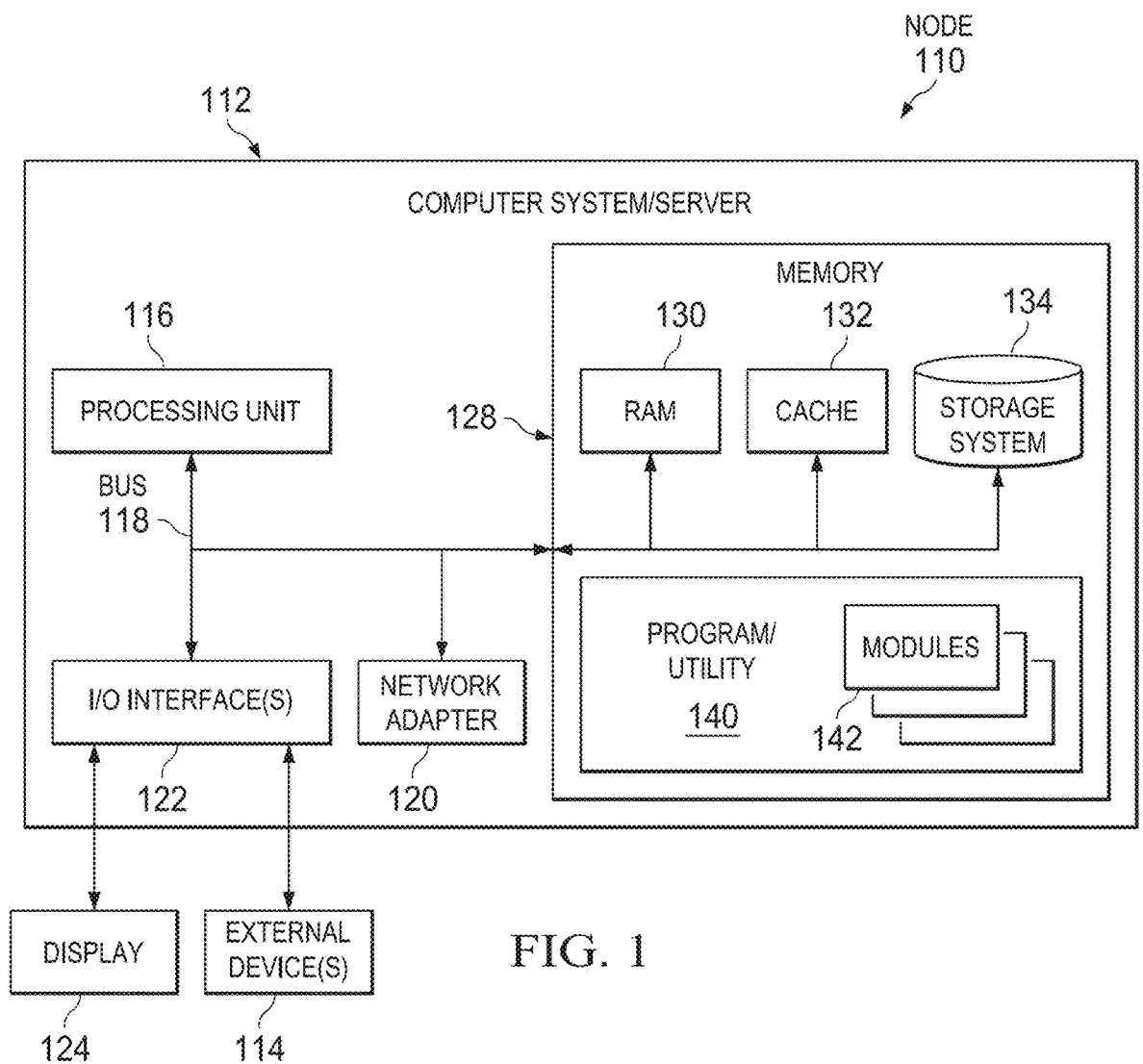
FIG. 1 is a schematic of an example of a cloud computing node shown according to an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Men and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure including a network of interconnected nodes.

Referring now to FIG. 1, a schematic of an example of a cloud computing node is shown. Cloud computing node 110 is only one example of a suitable cloud computing node and is not intended to suggest any limitation as to the scope of use or functionality of embodiments of the invention described herein. Regardless, cloud computing node 110 is capable of being implemented and/or performing any of the functionality set forth hereinabove.

In cloud computing node 110 there is a computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 112 in cloud computing node 110 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the invention.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention as described herein.

Computer system/server 112 may also communicate with one or more external devices 14 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, redundant processing units, external disk drive arrays, RAID systems, tape drives, and data archival storage systems, etc.

Figure 2:
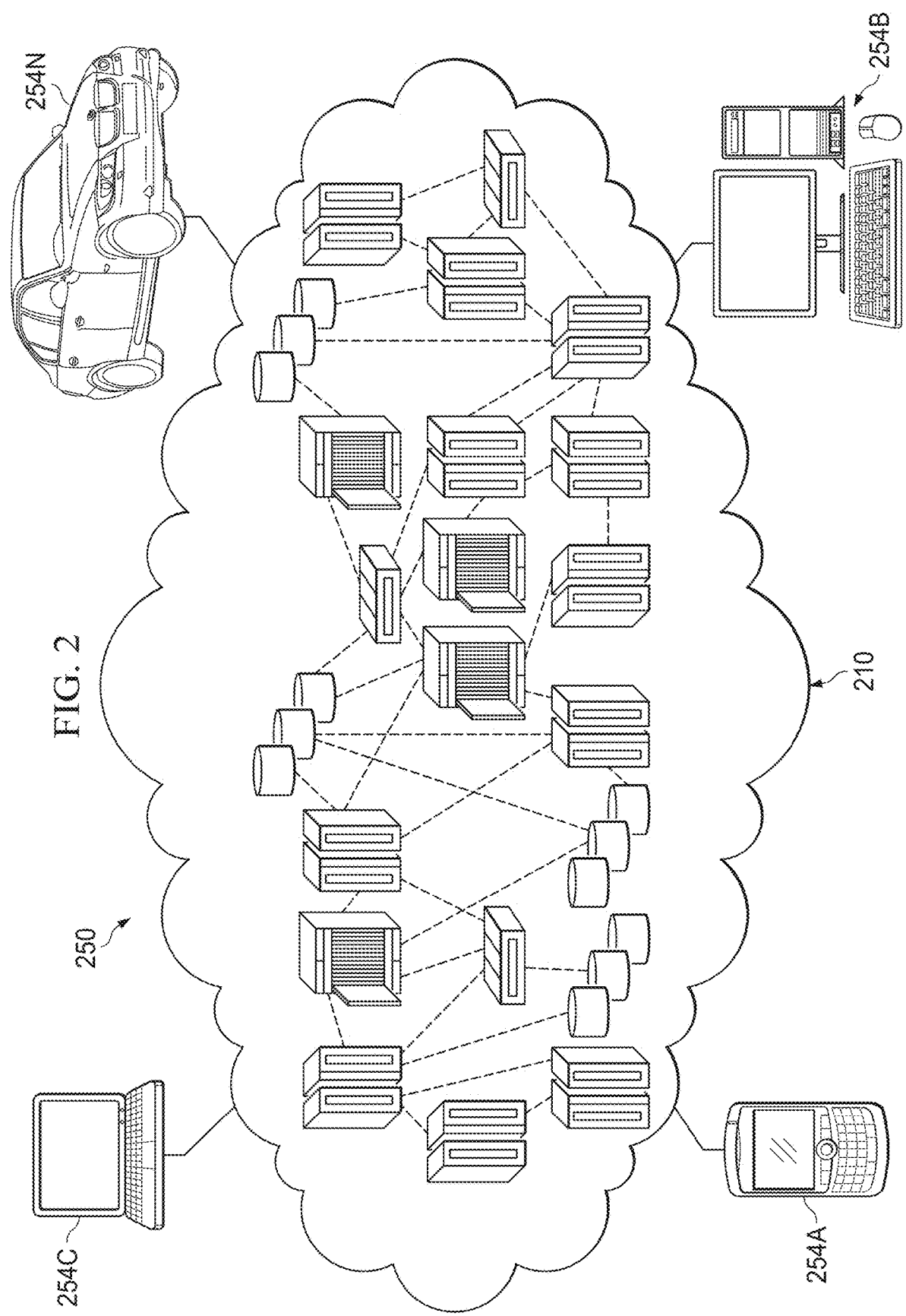
FIG. 2 is a cloud computing environment depicted according to an illustrative embodiment.

Referring now to FIG. 2, illustrative cloud computing environment 250 is depicted. As shown, cloud computing environment 250 includes one or more cloud computing nodes 210 with which local computing devices used by cloud consumers, such as, for example, personal digital assistant (PDA) or cellular telephone 254A, desktop computer 25413, laptop computer 254C, and/or automobile computer system 254N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 250 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
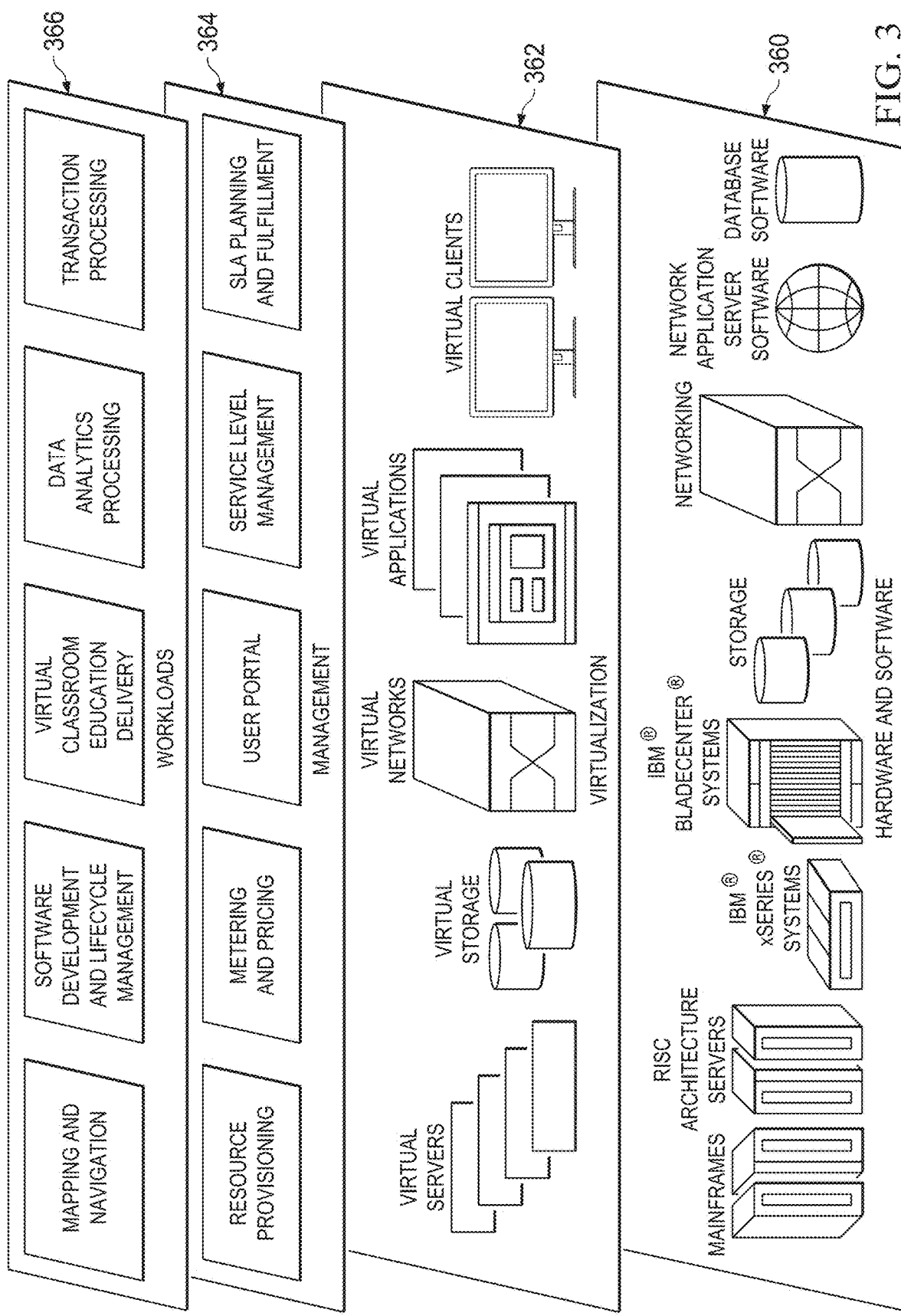
FIG. 3 is a set of functional abstraction layers provided by a cloud computing environment according to an illustrative embodiment.

Referring now to FIG. 3, a set of functional abstraction layers provided by cloud computing environment 250 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of international Business Machines Corporation registered in many jurisdictions worldwide)

Virtualization layer 362 provides an abstraction layer from which the following examples of virtual entities may be provided: virtual servers; virtual storage; virtual networks, including virtual private networks; virtual applications and operating systems; and virtual clients.

In one example, management layer 364 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

In one example, management layer 364 may provide the functions described below. Applications, including all of the application components that include the application, are typically deployed to a common nodes or virtual machines within a cloud infrastructure. Thus, each instance of an application will contain each application component required for execution of the application.

Workloads layer 366 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop processing.

Based on the sensitivities to downtime, as defined by restore point objectives and restore time objectives of service level agreements, organizations apply different strategies to backup business critical data. Even though, exact data protection strategies may vary, good data protection (backup) must be a universal part of an overall risk management strategy. Service provider-managed model of backup-recovery also defines service level agreements in terms of backup coverage, frequency of backup, mode of backup and periodic testing of backup with service provider.

Testing of backup is a very critical part of the complete data protection ecosystem. Testing of backup, such as the validation of integrity of backup image, is performed to test the quality and completeness of the backup images. However, this particular aspect of testing often gets low priority. Hardware and software resources are often unavailable. Skills required to perform the testing effectively are labor intensive, and often either intrusive/non-intrusive due to regulations that apply on the data. Sampling from numerous backups and scheduling the testing procedure also hamper and delay backup testing.

Premium service level agreements require data protection service providers periodically sample and test-restore backup images. This process ensures multiple objectives. The backup is ensured to be completed successfully in reality irrespective of the status reported by data protection software. The backup is ensured to be restorable from application perspective, such as for a database if both data and logs were backed up together consistently. Furthermore, the backup provides insight into the exact Recovery Time Objective the environment is expected to achieve.

Current business resiliency or data protection cost cases have not captured the backup integrity verification aspects very well into the proposals. Along with this business case deficiency, it also remains a huge technical challenge for a data protection administrator to get a deep insight of the planning from a restore test perspective. Currently, there is no framework or software artifact that exists in marketplace that can plan and enable restore testing of data protection environment in a smarter and faster way much like a cloud offering.

Data protection administrators in a typical service provider-managed operational environment can spend anywhere from several days to several weeks planning and analyzing restore-testing scenarios. Furthermore, collaboration primitives are unavailable in this domain for administrators to share their information in a large service provider environment.

Illustrative embodiments herein define generation and maintenance of the test containers in a factory model based on the continuous analysis of the complete environment addressing the first challenge stated above. These test containers can be then restored/retrieved from a central location on demand. File systems, databases and major applications are then restored on an alternate infrastructure than the production infrastructure. Successful restoration of backup images on the bare metal infrastructure not only ensures the validity of the backup images but also provides a deep insight into the restore time objectives guarantees promised.

Creation of alternate bare metal infrastructure for testing is a difficult proposition to justify in an enterprise from a Return on Investment (ROI) perspective. Thus, the illustrative embodiments use a combination of virtualization and data protection technologies to maintain a repository of backup test containers. The illustrative embodiments build these containers incrementally based on the threshold of adoption of particular infrastructure containers. The containers are offered via a service model, such as by maintaining the containers internally by enterprises, as in a private cloud model, or by maintaining and offering the containers on demand by service providers, as in a public cloud model.

To make this process smart and efficient, the illustrative embodiments automate steps of this process and enable significant value-add for a large scale data protection service provider. When containers of particular type get popular, they are protected, backed-up and made available at a central repository. Containers of specific unique combinations that are not easily derivable from existing repository can also be protected, backed-up and made available. Additionally, administrators can search and reuse the protected, backed-up containers in a large service provider environment.

The data protection environment of the illustrative embodiments periodically scans to find the unique containers—containers with unique software stack and containers that can not be easily derived—that are popular beyond a threshold. Containers are maintained within a central data protection repository of containers. Containers can be created within the repository, for example, by converting an existing physical machine into the virtual container, or by cloning or snapshotting an existing virtual machine. The creation can additionally involve cleansing of the container.

Containers within the repository can also be updated by restoring existing containers, and applying incremental changes to the software stack therein. Metadata describing the software stack allows administrators to search and reuse the containers through a full/partial ranked match of container types with a given input based on a taxonomy and interoperability.

Thus, illustrative embodiments of the present invention provide a computer implemented method, computer system, and computer program product for creating a restore container. An existing data protection environment is analyzed to determine a plurality existing infrastructure containers. A popular infrastructure container is identified from the plurality of existing infrastructure containers, Responsive to determining that the popular infrastructure container does not exist within a central repository, the restore container is created within the central repository to match the popular infrastructure container.

Figure 4:
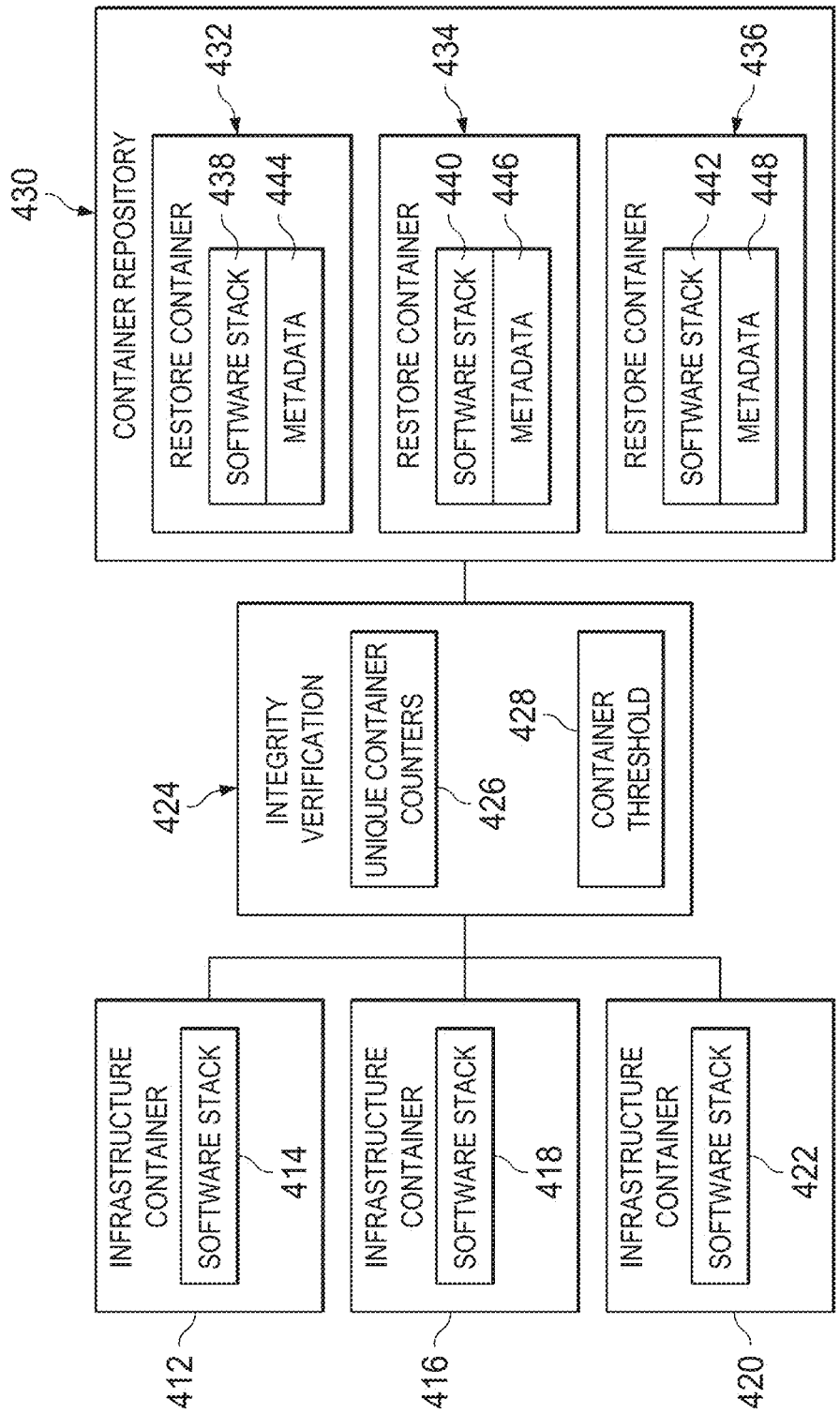
FIG. 4 is a data flow for a data protection environment shown according to a illustrative embodiment.

Referring now to FIG. 4, a data flow for a data protection environment is shown according to a illustrative embodiment. Data protection environment 400 can execute within a management layer of cloud computing environment, such as management layer 64 of FIG. 3.

Infrastructure container 412 is a virtual machine provided within a virtualization layer of a cloud computing environment, such as virtualization layer 362 of cloud computing environment 350, as shown in FIGS. 2 and 3 above. Infrastructure container 412 may provide service provider-managed backup-recovery services defined by a service level agreement in terms of backup coverage, frequency of backup, mode of backup and periodic testing of backup with service provider.

Software stack 414 is a set of software subsystems or components executing on infrastructure container 412 that are needed to deliver a fully functional product or service. For providing service provider-managed backup-recovery services, software stack 414 can include, but is not limited to an Operating System Image software component, a Data Protection Client Software component, any necessary compatible Middleware components, and the Application software component.

The operating system image software component, can be, for example, can be the Advanced interactive eXecutive (AIX) operating system, available from International Business Machines Corporation. The Data Protection Software can be, for example, Tivoli Storage Manager TSM version 6.1 Data Protection Software TSM API Client for DB2 6.1. The application can be for example, a database application, such as IBM DB2 UDB enterprise relational database 9.5, or an web server application, such as Websphere Application Server version 8.0

Infrastructure container 416 and infrastructure container 420 are infrastructure containers similar to infrastructure container 412. Infrastructure container 416 includes software stack 418. Infrastructure container 420 includes software stack 422. Each of software stack 418 and software stack 422 is a software stack similar to software stack 414. Software stack 418 and software stack 422 can include an Operating System Image software component, a Data Protection Client Software component, any necessary compatible Middleware components, and the Application software component. Any of the Operating System Image software component, Data Protection Client Software component, necessary compatible Middleware components, and Application software component within software stack 418 and software stack 422 can be identical to or different from the Operating System Image software component, Data Protection Client Software component, necessary compatible Middleware components, and Application software component contained within software stack 414. Additionally, any of the Operating System Image software component, Data Protection Client Software component, necessary compatible Middleware components, and Application software component within software stack 418 can be identical to or different from the Operating System Image software component, Data Protection Client Software component, necessary compatible Middleware components, and Application software component contained within software stack 422.

Integrity verification 424 is a software component that performs container identification in order to maintain a repository of backup restore containers. Data protection environment 400 then makes those restore containers available for testing of backup images to verify the quality and completeness of the backup images. Integrity verification 424 periodically scan the data protection environment 400 to identify infrastructure containers, such as infrastructure container 412, infrastructure container 416, and infrastructure container 420, that are unique or popular containers. Unique containers are those infrastructure containers having a unique software stack, or those infrastructure containers whose software stack cannot be easily derived from existing stored restore containers. Popular containers are defined by a number of instances that utilize a particular container types in a service provider environment.

Integrity verification 424 includes unique container counters 426. Unique container counters 426 are counters that track a number of instances that utilize a particular container types. A corresponding one of unique container counters 424 is incremented for each instance utilizing a particular container type. When the corresponding one of unique container counters 424 exceeds container threshold 428, Integrity verification 424 protects the associated infrastructure container, such as infrastructure container 412, infrastructure container 416, and infrastructure container 420, by backing-up and making available the associated infrastructure container at central repository 430. Containers of specific unique combinations that are not easily derivable from existing repository can also be protected/backed-up and made available at central repository 430.

Central repository 430 is central data protection repository of containers that can be restored for restore testing. Our framework uses a combination of virtualization and data protection technologies to maintain a repository of backup test containers. These containers can be built incrementally based on the threshold of adoption of particular infrastructure containers. The containers are offered via a service model, such as by maintaining the containers internally by enterprises, as in a private cloud model, or by maintaining and offering the containers on demand by service providers, as in a public cloud model.

Central repository 430 includes restore container 432, restore container 434, and restore container 436. Each of restore container 432, restore container 434, and restore container 436 is a machine (physical/virtual) with a particular software combination required to restore a client object. Each of restore container 432, restore container 434, and restore container 436 corresponds to a particular software stack utilized by one or more infrastructure containers, such as infrastructure containers, such as infrastructure container 412, infrastructure container 416, and infrastructure container 420. Each of restore container 432, restore container 434, and restore container 436 is a restore container for one or more an infrastructure containers, such as infrastructure container 412, infrastructure container 416, and infrastructure container 420, that is a unique or popular infrastructure container. For example, a restore container may include: [Linux Operating System version 5. 5, Data Protection Software TSM version 6.1, Data Protection Software TSM API Client for DB2 6.1, IBM DB2 UDB enterprise relational database 9.5, Websphere Application Server version 8.0]

Software stack 438 is a set of software subsystems or components executing on infrastructure container 438 that are needed to deliver a fully functional product or service. For providing service provider-managed backup-recovery services, software stack 438 can include, but is not limited to an Operating System Image software component, a Data Protection Client Software component, any necessary compatible Middleware components, and the Application software component. Software stack 438 is a particular software stack utilized by one or more infrastructure containers, such as infrastructure containers, such as infrastructure container 412, infrastructure container 416, and infrastructure container 420.

Restore container 434 includes software stack 440. Restore container 436 includes software stack 442. Each of software stack 440 and software stack 442 is a particular software stack utilized by one or more infrastructure containers, such as infrastructure containers, such as infrastructure container 412, infrastructure container 416, and infrastructure container 420. Software stack 440 and software stack 442 can include an Operating System Image software component, a Data. Protection Client Software component, any necessary compatible Middleware components, and the Application software component.

Each of restore container 432, restore container 434, and restore container 436 has metadata associated therewith. When utilized in a large service provider environment, the metadata allows administrators to search and reuse restore containers.

Metadata 444 is associated with restore container 432. Metadata 444 is a description of software stack 438, including the Operating System Image software component, Data Protection Client Software component, necessary compatible Middleware components, and Application software component contained within software stack 438.

Metadata 446 is associated with restore container 434. Metadata 446 is a description of software stack 438, including the Operating System Image software component, Data Protection Client Software component, necessary compatible Middleware components, and Application software component contained within software stack 440.

Metadata 448 is associated with restore container 436. Metadata 448 is a description of software stack 442, including the Operating System Image software component, Data Protection Client Software component, necessary compatible Middleware components, and Application software component contained within software stack 442.

Figure 5:
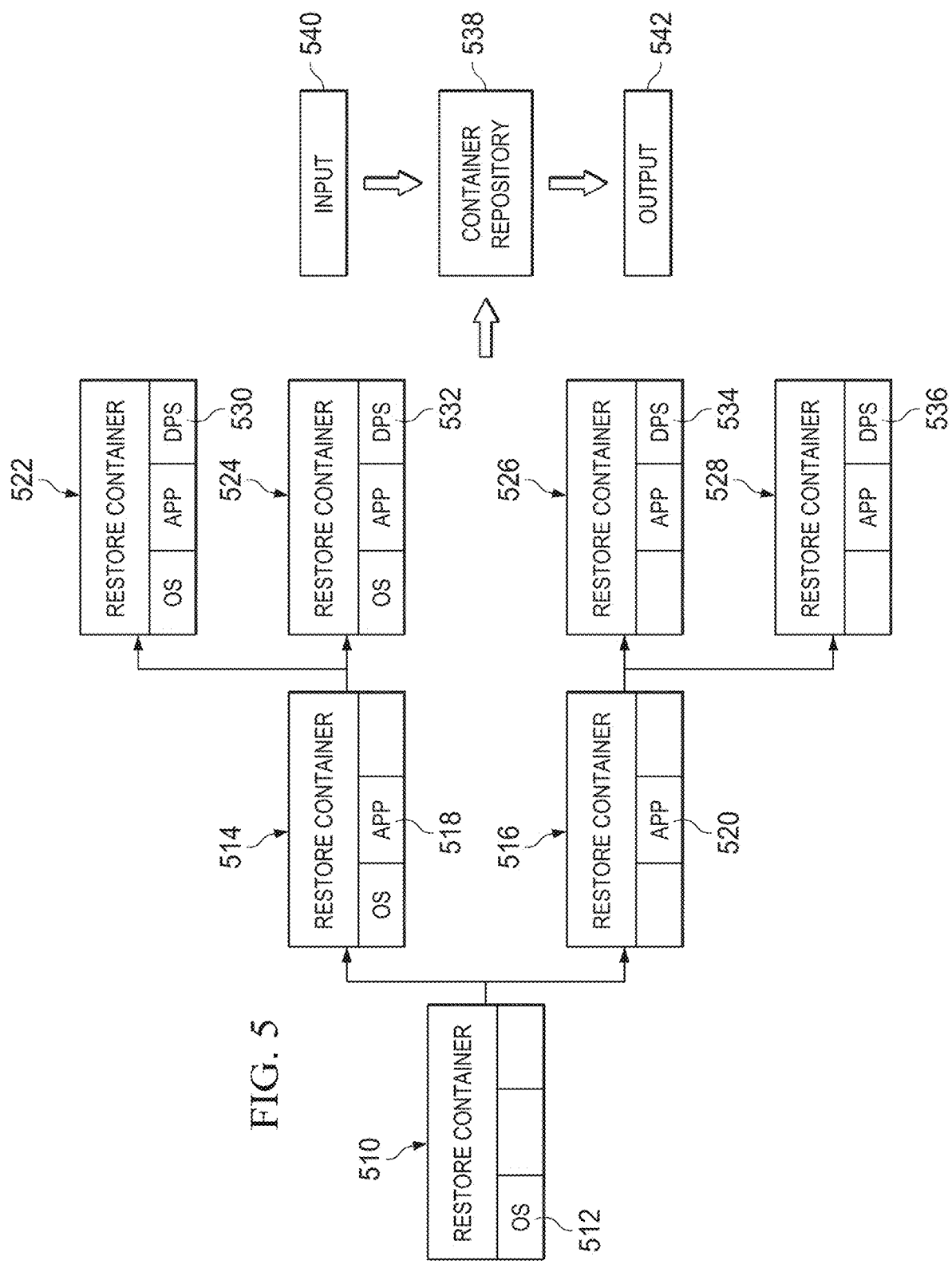
FIG. 5 is a data flow for creation and deployment of restore containers shown according to an illustrative embodiment.

Referring now to FIG. 5, a data flow for creation and deployment of restore containers is shown according to an illustrative embodiment. The data flow of FIG. 5 illustrates incremental changes applied to restore containers stored within a container repository, such as container repository 430 of FIG. 4.

Restore container 510 is a restore container such as one of restore container 432, restore container 434, and restore container 436 of FIG. 4. Restore container includes operating system image 512. Operating system image 512, together with any Data Protection Client Software component, any necessary compatible Middleware components, and the Application software component, make up a software stack for restore container 510, such as software stack 438, software stack 440, and software stack 442 of FIG. 4.

In the data flow of FIG. 5, a plurality of applications can be included within the software stacks of the various restore containers. While FIG. 5 shows only two such applications, such is for illustrative purposes only. Additional applications that can be utilized to create additional stacks are also contemplated, and are clearly within the illustrative embodiments.

Restore container 514 includes application image 518. Application image 518, together with any Operating system, Data Protection Client Software component, any necessary compatible Middleware components, make up a software stack for restore container 514, such as software stack 438, software stack 440, and software stack 442 of FIG. 4.

The operating system image of restore container 514 is operating system image 512. Because restore container 514 and restore container 510 share a common operating system image, a substantial overlap in data exists between restore container 514 and restore container 510. In one illustrative embodiment, an integrity verification, such as integrity verification 424 of FIG. 4, leverages this substantial overlap in data to save storage space. Therefore, in one illustrative embodiment, restore container 514 can be a delta file from restore container 510, storing only the differences between restore container 514 and restore container 510. Those differences consist substantially of application image 518.

Restore container 516 includes application image 520. Application image 520, together with any Operating system, Data Protection Client Software component, any necessary compatible Middleware components, make up a software stack for restore container 516, such as software stack 438, software stack 440, and software stack 442 of FIG. 4.

The operating system image of restore container 516 is operating system image 512. Because restore container 516 and restore container 510 share a common operating system image, a substantial overlap in data exists between restore container 516 and restore container 510. In one illustrative embodiment, an integrity verification, such as integrity verification 424 of FIG. 4, leverages this substantial overlap in data to save storage space. Therefore, In one illustrative embodiment, restore container 516 can be a delta file from restore container 510, storing only the differences between restore container 516 and restore container 510. Those differences consist substantially of application image 520.

In the data flow of FIG. 5, a plurality of data protection software can be included within the software stacks of the various restore containers. While FIG. 5 shows only two such data protection software, such is for illustrative purposes only. Additional data protection software that can be utilized to create additional stacks are also contemplated, and are clearly within the illustrative embodiments.

Restore container 522 includes data protection software 530. data protection software 530, together with any Operating system, any necessary compatible Middleware components, and the Application software component, make up a software stack for restore container 514, such as software stack 438, software stack 440, and software stack 442 of FIG. 4.

The operating system image of restore container 522 is operating system image 512. The application image of restore container 522 is application image 518. Because restore container 522 and restore container 514 share a common operating system image and application, a substantial overlap in data exists between restore container 522 and restore container 514. In one illustrative embodiment, an integrity verification, such as integrity verification 424 of FIG. 4, leverages this substantial overlap in data to save storage space. Therefore, In one illustrative embodiment, restore container 522 can be a delta file from restore container 514, storing only the differences between restore container 522 and restore container 514. Those differences consist substantially of data protection software 530.

Restore container 524 includes data protection software 532. data protection software 532, together with any Operating system, any necessary compatible Middleware components, and the Application software component, make up a software stack for restore container 514, such as software stack 438, software stack 440, and software stack 442 of FIG. 4.

The operating system image of restore container 524 is operating system image 512. The application image of restore container 524 is application image 518. Because restore container 524 and restore container 514 share a common operating system image and application, a substantial overlap in data exists between restore container 524 and restore container 514. In one illustrative embodiment, an integrity verification, such as integrity verification 424 of FIG. 4, leverages this substantial overlap in data to save storage space. Therefore, in one illustrative embodiment, restore container 524 can be a delta file from restore container 514, storing only the differences between restore container 524 and restore container 514. Those differences consist substantially of data protection software 532.

Restore container 526 includes data protection software 534. data protection software 534, together with any Operating system, any necessary compatible Middleware components, and the Application software component, make up a software stack for restore container 526, such as software stack 438, software stack 440, and software stack 442 of FIG. 4.

The operating system image of restore container 526 is operating system image 512. The application image of restore container 526 is application image 520. Because restore container 526 and restore container 516 share a common operating system image and application, a substantial overlap in data exists between restore container 526 and restore container 516. In one illustrative embodiment, an integrity verification, such as integrity verification 424 of FIG. 4, leverages this substantial overlap in data to save storage space. Therefore, In one illustrative embodiment, restore container 526 can be a delta file from restore container 516, storing only the differences between restore container 526 and restore container 516. Those differences consist substantially of data protection software 534.

Restore container 528 includes data protection software 536, data protection software 536, together with any Operating system, any necessary compatible Middleware components, and the Application software component, make up a software stack for restore container 528, such as software stack 438, software stack 440, and software stack 442 of FIG. 4.

The operating system image of restore container 528 is operating system image 512. The application image of restore container 524 is application image 520. Because restore container 528 and restore container 516 share a common operating system image and application, a substantial overlap in data exists between restore container 528 and restore container 516. In one illustrative embodiment, an integrity verification, such as integrity verification 424 of FIG. 4, leverages this substantial overlap in data to save storage space. Therefore, In one illustrative embodiment, restore container 528 can be a delta file from restore container 516, storing only the differences between restore container 528 and restore container 516. Those differences consist substantially of data protection software 536.

Based on the popularity of the various restore containers, any of restore container 510, restore container 514, restore container 516, restore container 522, restore container 524, restore container 526, and restore container 528 can be stored in container repository 538. Container repository 538 is container repository 430 of FIG. 4.

Input 540 is a request for a restore container to be instantiated for use in backup verification. Input 540 includes a required software stack, specifying an operating system, an application, and a data protection software.

Based on input 540, an integrity verification, such as integrity verification 424 of FIG. 4, identifies the restore container within container repository 538 having a software stack most similar to the software stack required by input 540.

In one illustrative embodiment, a most similar restore container is determined in according to a hierarchy of operating system, application, and then data protection software. Thus, a restore container having an operating system that matches the operating system of the input is considered to be more similar than is a restore container having a matching application and data protection software but a dissimilar operating system.

Once the restore container within container repository 538 having a software stack most similar to the software stack required by input 540 is identified, any necessary changes are applied to the software stack most similar to the software stack required by input 540 in order to conform the software stack most similar to the software stack required by input 540.

Referring now to FIG. 6, a data structure containing metadata describing software stacks of restore containers is shown according to an illustrative embodiment. Data structure 600 can be stored in conjunction with a container repository, such as container repository 430 of FIG. 4.

Metadata within data structure 600 can be metadata such as metadata 444, metadata 446, and metadata 448 of FIG. 4.

Restore Container identifier 610 is a code assigned by an Integrity verification, such as integrity verification 424 of FIG. 4, to each restore container, such as restore container 432, 434, and 436 of FIG. 4, stored within a container repository, such as container repository 430 of FIG. 4. Restore Container identifier 610 provides a method for uniquely identifying each restore container stored within the container repository.

Operating system 620 is an indication of the operating system utilized by the restore container indicated by Restore Container identifier 610. Data protection software 630 is an indication of the data protection software utilized by the restore container indicated by Restore Container identifier 610. Application software 640 is an indication of the application software utilized by the restore container indicated by Restore Container identifier 610.

Data structure 600 allows a user or a integrity verifier to query existing restore containers within the container repository by utilizing the associated metadata by querying existing restore containers, a restore container having desired characteristics can be identified for use as backup/testing container.

Figure 7:
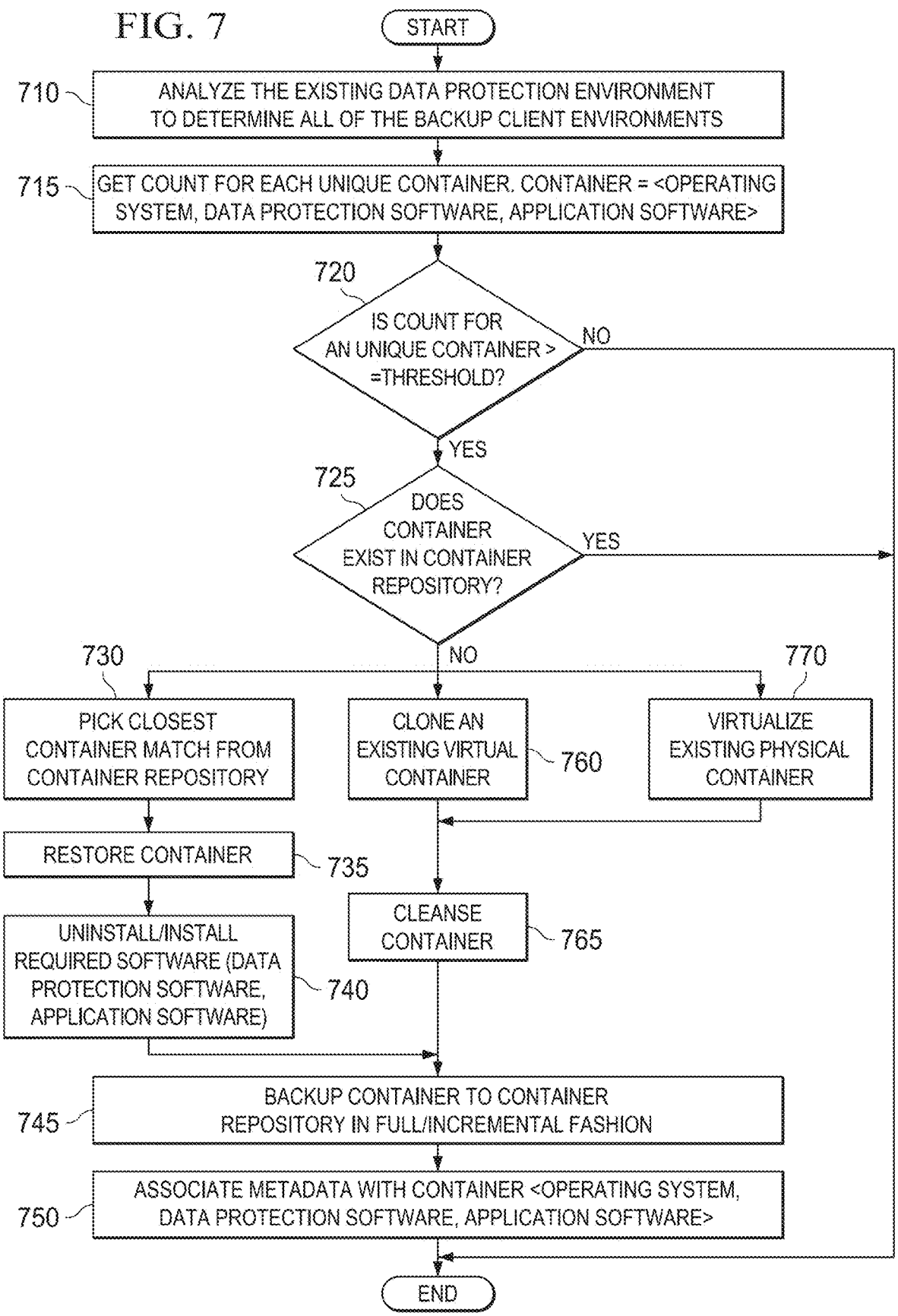
FIG. 7 is a flowchart showing the creation of a restore container shown according to an illustrative embodiment.

Referring now to FIG. 7, a flowchart showing the creation of a restore container is shown according to an illustrative embodiment. Process 700 is a software process, executing on a software component, such as integrity verification 424 of FIG. 4.

Process 700 begins by analyzing the existing data protection environment to determine all of the existing infrastructure containers (step 710). The infrastructure containers can be, for example, infrastructure container 412, infrastructure container 416, and infrastructure container 420 of FIG. 4. Process 700 analyzes the existing data protection environment to determine unique infrastructure containers having unique combinations of an Operating System Image software component, a Data Protection Client Software component, any necessary compatible Middleware components, and An Application software component.

Responsive to analyzing the existing data protection environment, process 700 determines a count for each unique restore infrastructure container (step 715). The count is stored as one of unique container counters 426 of FIG. 4. Unique container counters 426 are counters that track a number of instances that utilize a particular container types. A corresponding one of unique container counters 424 is incremented for each instance utilizing a particular container type. When the corresponding one of unique container counters 424 exceeds container threshold 428, Integrity verification 424 protects the associated infrastructure container, such as infrastructure container 412, infrastructure container 416, and infrastructure container 420, by backing-up and making available the associated infrastructure container at central repository 430. Containers of specific unique combinations that are not easily derivable from existing repository can also be protected/backed-up and made available at central repository 430.

Responsive to determining the count for each unique restore infrastructure container, process 700 determines whether the count for a unique container is greater than or equal to a threshold (step 720). The threshold can be threshold 428 of FIG. 4. The threshold is a measure of the popularity of the container. Popular containers are defined by a number of instances that utilize a particular container types in a service provider environment.

Responsive to the count for a unique container is not greater than or equal to a threshold ("no" at step 720), process 700 terminates. Process 700 does not create a restore container for the infrastructure container because the infrastructure container is not a popular container.

Returning now to step 720, responsive to the count for a unique container is greater than or equal to a threshold ("yes" at step 720), process 700 determines whether the container already exists within a central repository as a restore container (step 725). The container exists within the central repository if the software stack within the infrastructure container matches the software stack of one of the restore containers within the central repository. The restore containers can be one of restore container 432, restore container 434, and restore container 436 of FIG. 4. The central repository can be central repository 430 of FIG. 4. The Central repository is central data protection repository of containers that can be restored for restore testing.

Responsive to determining that the container already exists ("yes" at step 725), process 700 terminates. A restore container having a similar software stack already exists within the central repository which can be used for restore testing. Process 700 therefore does not make a duplicate restore container within the central repository/

Returning now to step 725, responsive to determining that the container does not exist within the central repository ("no" at step 725), process 700 can create a restore container within the central repository to match the popular infrastructure container. Process 700 can create the restore container by one of several methods.

According to one illustrative embodiment, responsive to determining that the container does not exist within the central repository ("no" at step 725), process 700 identifies a closest container match from container repository (step 730). The closest container match is a restore container existing within the central repository that has a software stack similar to the software stack of the popular infrastructure container. The restore container existing within the central repository has a software stack similar to the software stack of the popular infrastructure container if the software stack of the restore container existing within the central repository and the software stack similar to the software stack of the popular infrastructure container have one or more identical sets of software subsystems or components. The identical sets of software subsystems or components can include, but are not limited to an Operating System Image software component, a Data Protection Client Software component, any necessary compatible Middleware components, and the Application software component.

Responsive to identifying the closest container match from container repository, process 700 restores the container (step 735). Process 700 restores the container by instantiating the container, including the software stack thereof, within a virtual machine.

Responsive to restoring the container, process 700 Uninstall/Install required software in the container (step 740). Because a closest match container was restored from container repository, the software stack of the restored container may not exactly match the required software stack for the unique container that is to be stored. Process 700 therefore uninstalls any software from the closest match container that is not required by the software stack of the infrastructure container to be stored. Similarly, process 700 installs any software to the closest match container that is required by the software stack of the infrastructure container to be stored, but is not currently contained within the closest match container.

Responsive to Uninstall/Install required software in the container, process 700 backs up the popular infrastructure container to the central repository (step 745). The popular infrastructure container is stored as a restore container, such as one of restore container 432, restore container 434, and restore container 436 of FIG. 4. Each restore container is a machine (physical/virtual) with a particular software combination required to restore a client object. The restore container corresponds to the particular software stack utilized by the popular infrastructure container. Step 745 can pull the decision of Full/Incremental from another Component/Box that makes the decision based on objective function that evaluates the importance of the container based on service level agreement analysis of Recovery Time Objective of accounts.

Responsive to backing up the popular infrastructure container to the central repository (step 745), process 700 associates metadata with container (step 750), with the process terminating thereafter. The metadata is a description of the software stack of the associated restore container, including metadata describing the Operating System Image software component, metadata describing the Data Protection Client Software component, metadata describing any necessary compatible Middleware components, and metadata describing the Application software component. When utilized in a large service provider environment, the metadata allows administrators to search and reuse restore containers Returning now to step 725, according to one illustrative embodiment, responsive to determining that the container does not exist within the central repository ("no" at step 725), process 700 clones an existing virtual container (step 760). The cloned virtual machine can be created, for example, from a snapshot of the existing virtual container.

Responsive cloning the existing virtual container, process 700 cleanses the container (step 765). The cloned virtual machine may contain other processes or applications that are not required by the popular container. Additionally, some processes and data may be access restricted due to service agreements. Therefore, in one illustrative embodiment, process 700 therefore cleanses the container by removing the unnecessary or restricted processes and data.

Responsive to cleansing the container, process 700 proceeds to step 745 to back up the popular infrastructure container to the central repository (step 745).

Returning now to step 725, according to one illustrative embodiment, responsive to determining that the container does not exist within the central repository ("no" at step 725), process 700 virtualizes an existing physical container (step 770). Here, the popular container exists only as an unvirtualized container executing on a physical machine. The container is therefore first converted to virtual machine, prior to backing up the container to the container repository.

Responsive to virtualizing an existing physical container, process 700 proceeds to step 765 to back up the popular infrastructure container to cleanse the container (step 745).

Thus, illustrative embodiments herein define generation and maintenance of the test containers in a factory model based on the continuous analysis of the complete environment addressing the first challenge stated above. These test containers can be then restored/retrieved from a central location on demand. File systems, databases and major applications are then restored on an alternate infrastructure than the production infrastructure. Successful restoration of backup images on the bare metal infrastructure not only ensures the validity of the backup images but also provides a deep insight into the restore time objectives guarantees promised.

Creation of alternate bare metal infrastructure for testing is a difficult proposition to justify in an enterprise from a Return on Investment (ROI) perspective. Thus, the illustrative embodiments use a combination of virtualization and data protection technologies to maintain a repository of backup test containers. The illustrative embodiments build these containers incrementally based on the threshold of adoption of particular infrastructure containers. The containers are offered via a service model, such as by maintaining the containers internally by enterprises, as in a private cloud model, or by maintaining and offering the containers on demand by service providers, as in a public cloud model.

To make this process smart and efficient, the illustrative embodiments automate steps of this process and enable significant value-add for a large scale data protection service provider. When containers of particular type get popular, they are protected, backed-up and made available at a central repository. Containers of specific unique combinations that are not easily derivable from existing repository can also be protected, backed-up and made available. Additionally, administrators can search and reuse the protected, backed-up containers in a large service provider environment.

The data protection environment of the illustrative embodiments periodically scans to find the unique containers—containers with unique software stack and containers that cannot be easily derived—that are popular beyond a threshold. Containers are maintained within a central data protection repository of containers. Containers can be created within the repository, for example, by converting an existing physical machine into the virtual container, or by cloning or snapshotting an existing virtual machine. The creation can additionally involve cleansing of the container.

Containers within the repository can also be updated by restoring existing containers, and applying incremental changes to the software stack therein. Metadata describing the software stack allows administrators to search and reuse the containers through a full/partial ranked match of container types with a given input based on a taxonomy and interoperability.

Thus, illustrative embodiments of the present invention provide a computer implemented method, computer system, and computer program product for creating a restore container. An existing data protection environment is analyzed to determine a plurality existing infrastructure containers. A popular infrastructure container is identified from the plurality of existing infrastructure containers. Responsive to determining that the popular infrastructure container does not exist within a central repository, the restore container is created within the central repository to match the popular infrastructure container.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for creating a new restore container, said method comprising:

determining, by one or more processors of a computer system, a count for each unique infrastructure container of a plurality of existing unique infrastructure containers, wherein the count for each unique infrastructure container is a number of instances in which a particular container type that is unique for each unique infrastructure container has been utilized, wherein the count for one unique infrastructure container of the plurality of existing unique infrastructure containers is equal to or greater than a specified threshold, wherein the one unique infrastructure container is designated as a popular infrastructure container due to the count for the one unique infrastructure container being equal to or greater than the specified threshold, and wherein the popular infrastructure container comprises a first software stack that includes a first operating system, a first application, and a first data protection software, and wherein the first data protection software and the first operating system are distinct from each other;

in response to said determining that the count for the one unique infrastructure container is equal to or greater than the specified threshold, determining, by one or more processors, whether the popular infrastructure container exists within a central repository that comprises a plurality of existing restore containers; and in response to determining that the popular infrastructure container does not exist within the central repository that stores the plurality of existing restore containers, creating, by the one or more processors, the new restore container within the central repository, wherein each existing restore container comprises a respective operating system, a respective application, and a respective data protection software in addition to the respective operating system, wherein said creating the new restore container comprises determining a most similar container of the plurality of existing restore containers whose software stack includes software subsystems or components that match, in part, software subsystems or components in the first software stack of the popular infrastructure container more closely than does software subsystems or components in the software stack of any other existing restore container of the plurality of existing restore containers, wherein a software stack of the new restore container does not exactly match the software stack of the popular infrastructure container, and wherein the most similar container is the new restore container comprising a particular software combination required to restore a client object corresponding to the popular infrastructure container.

2. The method of claim 1, said method further comprising:

determining the plurality of existing unique infrastructure containers by analyzing an existing data protection environment.

3. The method of claim 1, wherein the popular infrastructure container is a virtual machine within a virtualization layer of a cloud computing environment.

4. The method of claim 1, wherein said creating the new restore container within the central repository comprises:

instantiating a software stack of the most similar container within a virtual machine;

uninstalling software from the most similar container that is not required by the software stack of the popular infrastructure container;

installing software to the most similar container that is required by the software stack of the popular infrastructure container but is not contained in the first existing restore container;

backing up the popular infrastructure container to the central repository; and associating metadata with the new restore container, wherein the metadata is a description of the software stack of the new restore container.

5. The method of claim 1, wherein the new restore container is a physical or virtual machine having the particular software combination required to restore a client object.

6. The method of claim 1, wherein the popular infrastructure container provides service provider-managed backup-recovery services defined by a service level agreement in terms of backup coverage, frequency of backup, mode of backup and periodic testing of backup with a service provider.

7. The method of claim 1, wherein said determining the most similar container is in accordance with a hierarchy of operating system, application, and data protection software in the software stack of the popular infrastructure container and of the plurality of existing restore containers.

8. The method of claim 7, wherein the software stack of the most similar container and the software stack of the popular infrastructure container comprise a same operating system and a different application and a different data protection software, and wherein the software stack of a different container of the plurality of existing restore containers and the software stack of the popular infrastructure container comprise a different operating system and a same application and a same data protection software.

9. A computer program product, comprising one or more computer readable hardware storage devices and computer readable program code stored on the one or more hardware storage devices, said program code containing instructions which, upon being executed by one or more processors of a computer system, implement a method for creating a restore container, said method comprising:

determining, by the one or more processors, a count for each unique infrastructure container of a plurality of existing unique infrastructure containers, wherein the count for each unique infrastructure container is a number of instances in which a particular container type that is unique for each unique infrastructure container has been utilized, wherein the count for one unique infrastructure container of the plurality of existing unique infrastructure containers is equal to or greater than a specified threshold, wherein the one unique infrastructure container is designated as a popular infrastructure container due to the count for the one unique infrastructure container being equal to or greater than the specified threshold, and wherein the popular infrastructure container comprises a first software stack that includes a first operating system, a first application, and a first data protection software, and wherein the first data protection software and the first operating system are distinct from each other;

in response to said determining that the count for the one unique infrastructure container is equal to or greater than the specified threshold, determining, by one or more processors, whether the popular infrastructure container exists within a central repository that comprises a plurality of existing restore containers; and in response to determining that the popular infrastructure container does not exist within the central repository that stores the plurality of existing restore containers, creating, by the one or more processors, the new restore container within the central repository, wherein each existing restore container comprises a respective operating system, a respective application, and a respective data protection software in addition to the respective operating system, wherein said creating the new restore container comprises determining a most similar container of the plurality of existing restore containers whose software stack includes software subsystems or components that match, in part, software subsystems or components in the first software stack of the popular infrastructure container more closely than does software subsystems or components in the software stack of any other existing restore container of the plurality of existing restore containers, wherein a software stack of the new restore container does not exactly match the software stack of the popular infrastructure container, and wherein the most similar container is the new restore container comprising a particular software combination required to restore a client object corresponding to the popular infrastructure container.

10. The computer program product of claim 9, said method further comprising:

determining the plurality of existing unique infrastructure containers by analyzing an existing data protection environment.

11. The computer program product of claim 9, wherein the popular infrastructure container is a virtual machine within a virtualization layer of a cloud computing environment.

12. The computer program product of claim 9, wherein said creating the new restore container within the central repository comprises:

instantiating a software stack of the most similar container within a virtual machine;

uninstalling software from the most similar container that is not required by the software stack of the popular infrastructure container;

installing software to the most similar container that is required by the software stack of the popular infrastructure container but is not contained in the first existing restore container;

backing up the popular infrastructure container to the central repository; and associating metadata with the new restore container, wherein the metadata is a description of the software stack of the new restore container.

13. The computer program product of claim 9, wherein the new restore container is a physical or virtual machine having the particular software combination required to restore a client object.

14. The computer program product of claim 9, wherein the popular infrastructure container provides service provider-managed backup-recovery services defined by a service level agreement in terms of backup coverage, frequency of backup, mode of backup and periodic testing of backup with a service provider.

15. A computer system comprising one or more processors, one or more memories, one or more computer readable hardware storage devices, and computer readable program code stored on the one or more hardware storage devices, said program code containing instructions which, upon being executed by the one or more processors via the one or more memories, implement a method for creating a restore container, said method comprising:

determining, by the one or more processors, a count for each unique infrastructure container of a plurality of existing unique infrastructure containers, wherein the count for each unique infrastructure container is a number of instances in which a particular container type that is unique for each unique infrastructure container has been utilized, wherein the count for one unique infrastructure container of the plurality of existing unique infrastructure containers is equal to or greater than a specified threshold, wherein the one unique infrastructure container is designated as a popular infrastructure container due to the count for the one unique infrastructure container being equal to or greater than the specified threshold, and wherein the popular infrastructure container comprises a first software stack that includes a first operating system, a first application, and a first data protection software, and wherein the first data protection software and the first operating system are distinct from each other;

in response to said determining that the count for the one unique infrastructure container is equal to or greater than the specified threshold, determining, by one or more processors, whether the popular infrastructure container exists within a central repository that comprises a plurality of existing restore containers; and in response to determining that the popular infrastructure container does not exist within the central repository that stores the plurality of existing restore containers, creating, by the one or more processors, the new restore container within the central repository, wherein each existing restore container comprises a respective operating system, a respective application, and a respective data protection software in addition to the respective operating system, wherein said creating the new restore container comprises determining a most similar container of the plurality of existing restore containers whose software stack includes software subsystems or components that match, in part, software subsystems or components in the first software stack of the popular infrastructure container more closely than does software subsystems or components in the software stack of any other existing restore container of the plurality of existing restore containers, wherein a software stack of the new restore container does not exactly match the software stack of the popular infrastructure container, and wherein the most similar container is the new restore container comprising a particular software combination required to restore a client object corresponding to the popular infrastructure container.

16. The computer system of claim 15, said method further comprising:
  determining the plurality of existing unique infrastructure containers by analyzing an existing data protection environment.

17. The computer system of claim 15, wherein the popular infrastructure container is a virtual machine within a virtualization layer of a cloud computing environment.

18. The computer system of claim 15, wherein said creating the new restore container within the central repository comprises:
  instantiating a software stack of the most similar container within a virtual machine;
  uninstalling software from the most similar container that is not required by the software stack of the popular infrastructure container;
  installing software to the most similar container that is required by the software stack of the popular infrastructure container but is not contained in the first existing restore container;
  backing up the popular infrastructure container to the central repository; and
  associating metadata with the new restore container, wherein the metadata is a description of the software stack of the new restore container.

19. The computer system of claim 15, wherein the new restore container is a physical or virtual machine having the particular software combination required to restore a client object.

20. The computer system of claim 15, wherein the popular infrastructure container provides service provider-managed backup-recovery services defined by a service level agreement in terms of backup coverage, frequency of backup, mode of backup and periodic testing of backup with a service provider.

* * * * *